United States Patent [19]

Ijlstra et al.

[11] 4,104,484
[45] Aug. 1, 1978

[54] CONDUCTOR LEAD-THROUGH

[75] Inventors: Hendrik Jan Ijlstra, Egmond a/d Hoef; Gerardus Joachim Maria van den Boogaard, Utrecht, both of Netherlands

[73] Assignee: Ultra Centrifuge Nederland N.V., The Hague, Netherlands

[21] Appl. No.: 687,299

[22] Filed: May 13, 1976

[30] Foreign Application Priority Data

Jun. 23, 1975 [NL] Netherlands ............... 7507440

[51] Int. Cl.² ............... H01B 17/30; H02K 5/22
[52] U.S. Cl. ............... 174/151; 310/71; 310/87
[58] Field of Search ............... 174/17 CT, 18, 50.5, 174/52 S, 151, 152 GM; 310/71, 87, 88; 339/126 R, 192 RL; 29/525; 220/310, 319, 320; 285/340; 417/902

[56] References Cited

U.S. PATENT DOCUMENTS

| 721,507 | 2/1903 | Fogg | 29/525 UX |
|---|---|---|---|
| 3,218,490 | 11/1965 | Eis et al. | 310/87 X |
| 3,555,370 | 1/1971 | Bowling | 174/52 S UX |

FOREIGN PATENT DOCUMENTS 1,092,083  11/1960  Fed. Rep. of Germany ... 174/152 GM Primary Examiner—Laramie E. Askin
Attorney, Agent, or Firm—Cushman, Darby & Cushman

[57] ABSTRACT

A conductor lead-through for elongated bodies, such as electric current conductors, which conductor lead-through is vacuum tight and contains no welded joints and is particularly suitable for use with difficultly weldable or non-weldable combinations of materials, said conductor lead-through comprising an assembly of parts including a cover, an intermediate ring engaging one end of the cover and a seal, such as an O-ring seal, the latter being fitted about said cover, said parts of said assembly being retained together and secured in an opening for that purpose by means of a clamp ring the periphery of which engages the wall of the opening.

2 Claims, 2 Drawing Figures

CONDUCTOR LEAD-THROUGH

The invention relates to a conductor lead-through for elongated bodies, such as electric current conductors, which conductor lead-through is vacuum tight and contains no welded joints, and is particularly suitable for use with difficulty weldable or non-weldable combinations of materials. Such lead-throughs for elongated bodies are known, as described, for example, in Australian Pat. No. 29,548. A pipe duct is there specified where a joint is made between an aluminium vessel wall and a steel pipe. The joint is vacuum tight and is obtained by bringing and maintaining an aluminium collar, which is fixed on the vessel wall, at a given pressure, as a result of which the collar material is plastically deformed and penetrates into the end of the steel pipe which is provided with sharp edges. Although a vacuum tight joint is indeed obtained without welding in this Australian patent specification, this joint is relatively complicated and therefore expensive. Producing the vacuum tight joint, and specifically the plastic deformation, furthermore requires the assembly of parts to be placed in a press.

The present invention aims at avoiding the aforementioned disadvantages by using a lead-through elongated bodies such as, for example, electric current conductors, which lead-through is very simple to fit and for which a simple O-ring functions as the vacuum tight seal which is retained in place and held under compression with the aid of a clamp ring provided with a flexible part which extends along its periphery. The O-ring is arranged between the so-called lid of the lead-through and a recess in the space in which the lead-through is fitted.

The invention will be further explained on the basis of the following description of the figures. The embodiment of the lead-through presented in the description of the figures merely serves as an example. Many other applications are possible, and are not excluded by the embodiment described.

Figure 1:
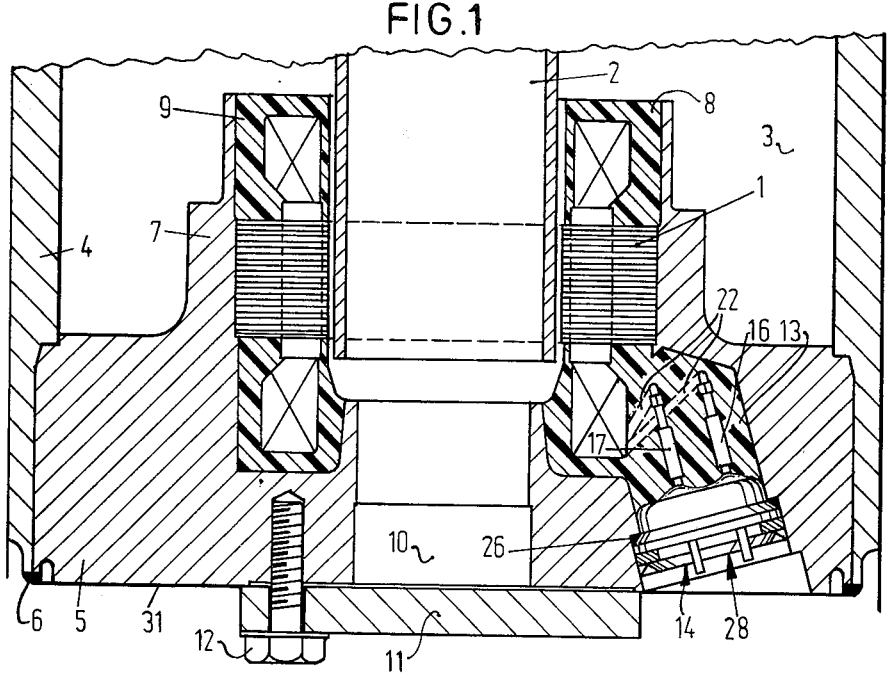
FIG. 1 is a partial vertical section through a conductor lead-through according to the invention, fitted in an end wall of a casing for an electric motor.
Figure 2:
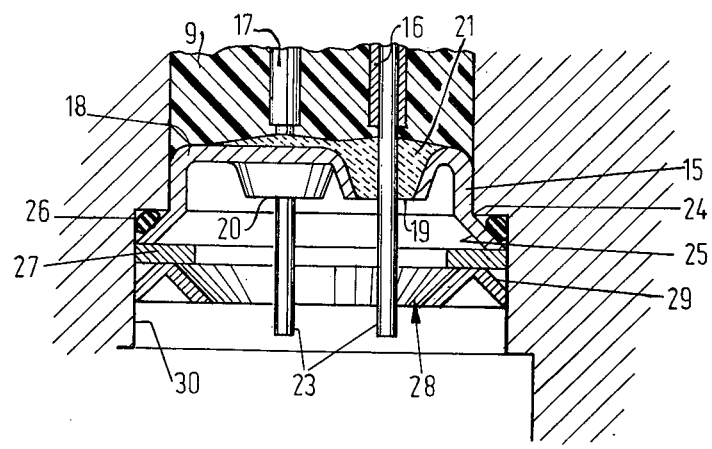
FIG. 2 is a fragmentary vertical sectional view, on an enlarged scale, of the conductor lead-through of FIG. 1.

In FIG. 1, the numbers 1 and 2 indicate the stator and the rotor, respectively, of an electric motor installed in the space 3 which is under a vacuum. The space 3 is bounded by a cylindrical wall 4 and an end wall 5, which is manufactured, for example, of aluminium and which is joined to the cylindrical wall 4 by means of a weld 6. The end wall 5 possesses an upright collar 7 which contains a cylindrical space 8 and in which the stator 1 is housed. The stator 1 is embedded in a filling composition 9. The space 8 extends on its lower side into a cylindrical recess 10 which is closed by means of the lid 11. The lid 11 is secured with a number of bolts 12 against the underside 31 of the end wall 5. A suitable seal, of which no details are shown in the drawing, is provided between the lid 11 and the end wall 5. The lid 11 is removable, for example for purposes of inspection and for repairs. The space 8 is furthermore accessible through a communicating cylindrical opening 13 provided on the side of the opening 10. The conductor lead-through 14 according to the invention is fitted in the opening 13. This lead-through comprises a cover 15 (also see FIG. 2), manufactured, for example, of a grade of steel, which contains two electric current conductors 16 and 17. The current conductors 16 and 17 are passed through two openings 19 and 20, which openings are formed in the upper wall 18 of the cover 15. The current conductors are sealed hermetically in the openings 19 and 20 by means of a fixing composition 21. The current conductors are connected on their upper ends by means of power cables 22 to the stator 1, in a manner of which no further details are shown. For the supply of power, the undersides 23 are connected to a source of electric current. The opening 13 is expanded on the level of 24, and the cover 15 possesses on its underside an outwardly flanged edge 25.

These last two measures lead to the creation at 24 of a space which, in a cross-sectional view, is triangular and ring-shaped, and which contains an O-ring seal 26. An intermediate ring 27 is fitted against the underside of the cover 15. Below this is a clamp ring 28, which is provided with a flexible part 29 extending along its periphery. A vacuum tight seal is obtained with the aid of the O-ring seal 26, since the O-ring is brought to and held in compression by means of the clamp ring 28.

Specifically, the flexible part 29 of the clamp ring has created a means of stress causing the clamp ring to be clamped tight in the expanded part 30 of the opening 13, the clamp ring 29 being arranged on such a level in the opening 30 that the O-ring 26 is partly compressed, thus preventing air or another ambient gas from penetrating into the vacuum space 3.

We claim:

1. A conductor lead-through for elongated bodies, comprising at least one electric current conductor, which conductor lead-through contains no welded joints and is particularly suitable for use with difficultly weldable or non-weldable combinations of materials, said conductor lead-through comprising an assembly of parts including a cover through which said current conductor passes in insulating relationship with respect thereto, said cover having an outwardly sloping flanged edge, an intermediate ring engaging the flanged edge of the cover, and an O-ring seal fitted about said cover and engaging the outer surface of the flanged edge of the cover and being held in compression between said outer surface and a shoulder on the wall of an opening into which said assembly is fitted, said parts of said assembly being retained together and secured in the opening by means of a clamp ring, said clamp ring having a flexible part which extends around its periphery and which engages the wall of the opening, the outer diameters of said clamp ring and said intermediate ring being the same.

2. A conductor lead-through comprising: a cover having an upper wall provided with at least one hole therein through which at least one electric current conductor passes in insulating relationship with respect thereto, said cover having a side wall terminating in an outwardly sloping flanged edge; an O-ring seal surrounding and in engagement with the outer surface of said flanged edge and in engagement with an outward shoulder formed on the inner surface of an aperture in a wall, the shoulder and the flanged edge forming a ring-shaped space which is triangular in cross section; an intermediate ring engaging said flanged edge; and a clamp ring engaging said intermediate ring, said clamp ring having a flexible part extending around its periphery and engaging the inner surface of said aperture thereby holding the assembly of cover, O-ring seal and intermediate ring in said aperture and holding said O-ring seal in compression between the outer surface of said flanged edge and said shoulder.

* * * * *